United States Patent
Moretti

(10) Patent No.: US 12,454,388 B2
(45) Date of Patent: Oct. 28, 2025

(54) CONTAINER

(71) Applicant: LUMSON S.p.A., Capergnanica (IT)

(72) Inventor: Matteo Moretti, Crema (IT)

(73) Assignee: LUMSON S.p.A., Capergnanica (IT)

(*) Notice: Subject to any disclaimer, the term of this patent is extended or adjusted under 35 U.S.C. 154(b) by 143 days.

(21) Appl. No.: 18/142,059

(22) Filed: May 2, 2023

(65) Prior Publication Data
US 2023/0348139 A1   Nov. 2, 2023

(30) Foreign Application Priority Data
May 2, 2022 (IT) .................. 102022000008741

(51) Int. Cl.
    *B65D 21/02* (2006.01)
    *B65D 1/12* (2006.01)
    *B65D 6/24* (2006.01)
    *B65D 41/04* (2006.01)

(52) U.S. Cl.
    CPC .......... *B65D 21/0233* (2013.01); *B65D 1/12* (2013.01); *B65D 11/1866* (2013.01); *B65D 41/04* (2013.01)

(58) Field of Classification Search
    CPC ... B65D 1/12; B65D 1/14; B65D 1/16; B65D 41/04; B65D 41/0407; B65D 41/0428; B65D 41/0435; B65D 21/0233
    See application file for complete search history.

(56) References Cited

U.S. PATENT DOCUMENTS 11,485,565 B2 * 11/2022 Nagy ................. B65D 77/0486
2021/0316930 A1   10/2021 Nagy

FOREIGN PATENT DOCUMENTS

| EP | 2243557 A1 * | 10/2010 | ....... B05B 11/00412 |
| EP | 2243557 B1 | 4/2015 | |
| EP | 3889068 A1 | 10/2021 | |
| KR | 101998357 B1 | 7/2019 | |

* cited by examiner

*Primary Examiner* — Javier A Pagan
(74) *Attorney, Agent, or Firm* — Dickinson Wright PLLC; Andrew D. Dorisio; Nicholas P. Coleman

(57) ABSTRACT

A container (1) including an external vessel (2) made of blown glass or plastic, which delimits a cavity (2A) in which an internal vessel (3) configured to house a fluid substance (6) is positioned, isolating the said fluid substance from the external vessel (2), the internal vessel (3) having a fixing portion (4) by means of which the said internal vessel is secured to the external vessel (2), at least at one of the mouths (2B) thereof; the fixing portion (4) has at least three protrusions (5) extending predominantly axially, the said protrusions being configured to deform upon contact with the mouth (2B) of the external vessel (2) thereby securing the internal vessel (3) to the external vessel by friction, in an easily removable manner.

17 Claims, 3 Drawing Sheets

CONTAINER

This application claims priority to Italian Patent for Invention No. 102022000008741 filed on May 2, 2022, the disclosure of which is hereby incorporated by reference.

FIELD OF THE INVENTION

The present invention relates to a container.

In particular, this invention refers to a container comprising an external blown vessel made of plastic or glass, which houses an internal vessel which can advantageously be replaced with a refill.

BACKGROUND ART

Various kinds of double containers made of glass/plastic or blown plastic/plastic are commonly known wherein the external vessel is made by blowing.

One of the major problems of these products occurs in the area of the coupling of the internal plastic vessel and the mouth of the external blown vessel.

Indeed, the tolerances applied when making the (moulded) internal vessel are very different from those achievable with the blowing technique used for the external vessel.

This creates notable drawbacks, especially in the event that one wishes to obtain a removable internal vessel, with a view to inserting a refill or with a view to allowing effective waste sorting.

SUMMARY OF THE INVENTION

The object of the present invention is to provide a container which is an improvement on the prior art.

A further object of the invention is to provide a container which is more environmentally compatible than those according to the prior art, in particular which is easily refillable and/or disposed of as sorted waste.

This and other objects are achieved by means of a container according to the technical teachings of the claims annexed hereto.

BRIEF DESCRIPTION OF THE FIGURES

Further features and advantages of the innovation will become clearer in the description of a preferred but not exclusive embodiment of the container, illustrated—by way of a non-limiting example—in the drawings annexed hereto, in which.

DETAILED DESCRIPTION OF THE INVENTION

Figure 1:
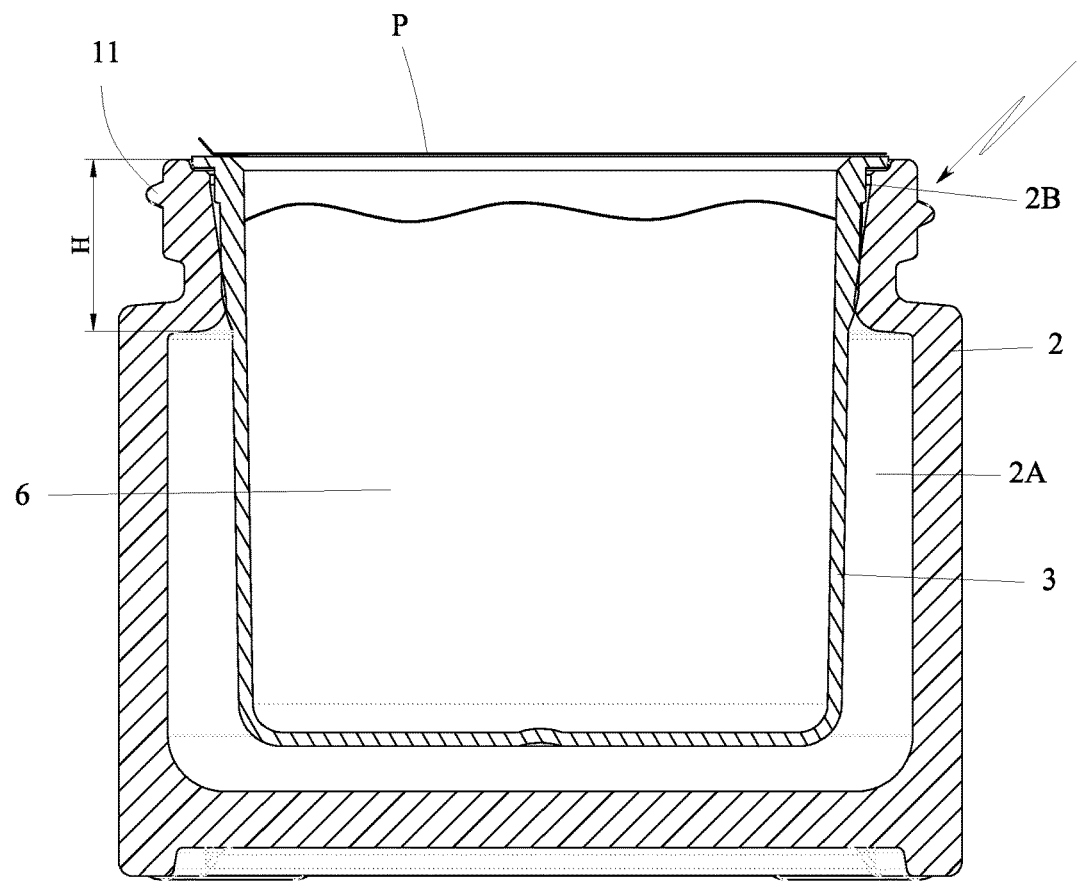
FIG. 1 is an axial sectional view of the container according to the present invention.
Figure 2:
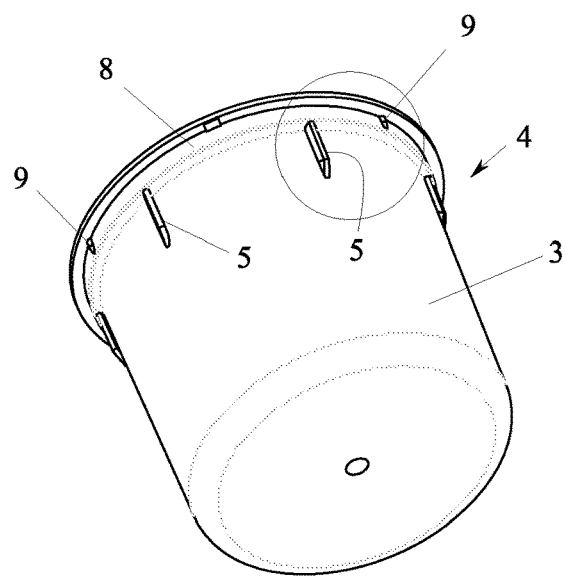
FIG. 2 is a bottom-up perspective view of an internal vessel of the container in FIG. 1.

With reference to the figures stated, reference number 1 is used to denote, as a whole, a container.

The container 1 comprises an external glass vessel 2, obtained by means of the technique known as blowing.

The finish of the glass may be of any kind, for example completely transparent, frosted, opaque, or screen-printed, coloured internally, lacquered, etc.

Alternatively, the external vessel 2 can be made of a plastic material but still formed using the technique known as blowing. Plastic materials useful for making the external vessel 2 may be one or more of the following: PET, PETG, HDPE, PP, SURLYN.

The external vessel delimits a cavity 2A in which an internal vessel 3 is housed, the said internal vessel being configured to house a fluid substance 6, isolating the said fluid substance from the external vessel 2.

The fluid substance is preferably of the cosmetic (or medical) kind. By way of example, substance 6 may be a cosmetic powder for make-up, a cream, a paste, a granular substance, or consisting of macroscopic corpuscles, or any other substance preferably, as already mentioned, in the cosmetic or medical field.

The internal vessel 3 is advantageously made of a plastic material, preferably by injection moulding. The said vessel may be made of one or more of the following materials: PP, PP, PET, PETG, PP/EVOH/PP, PE/EVOH/PE.

The internal vessel 3 has a fixing portion 4 by mean of which the said vessel is removably secured to the external vessel 2, at least at one of the mouths 2B thereof.

According to the invention the fixing portion 4 has at least three protrusions 5 extending predominantly axially (therefore, extending essentially parallel to the axis A of the internal vessel 3), the said protrusions being configured to deform when they come into contact with the mouth 2B of the external vessel 2, thereby securing the internal vessel 3 to the external vessel by friction.

The protrusions 5 essentially recover and adapt to the clearances and tolerances imposed by glass (or plastic) blowing, allowing easy adaptation and (removable) fixing of the internal vessel 3 to the external vessel 2.

In the example, there are six protrusions shown but obviously any number of protrusions may be envisaged, from three upwards.

As already mentioned, the protrusions 5 essentially extend axially, meaning that they have a very limited width L2 with respect to their length L1. The ratio between width L2 and length L1 is advantageously between 1:5 and 1:12, preferably 1:8.

The long side of the protrusions 5 is essentially parallel to the axis A.

Figure 9:
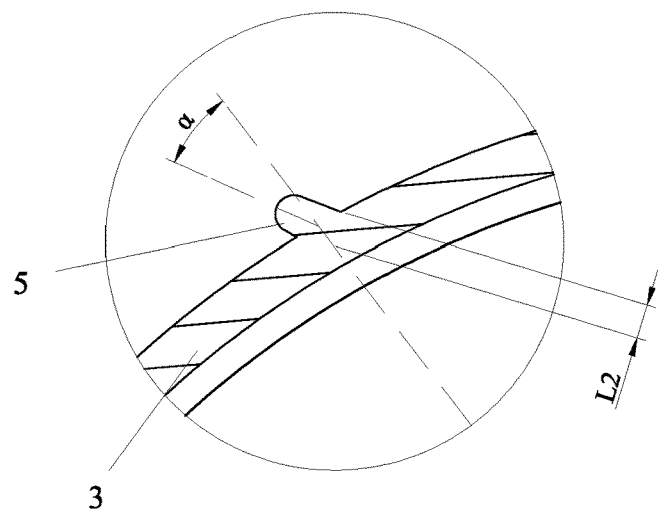
FIG. 9 is an enlargement of the part circled in FIG. 7.

At least one of the said protrusions 5 (but advantageously all thereof), from a (perpendicular) cross-sectional view with respect to the axis A of the internal vessel 3 (see FIG. 9), is inclined, by an angle α other than zero, with respect to a normal R to the external surface of the internal vessel 3 running through a base 5A of each protrusion.

In the event that the internal vessel has a circular section, this normal R may be a radius of the internal vessel 3.

Advantageously, the angle α is between 15 and 60°, preferably between 30 and 45°.

Figure 7:
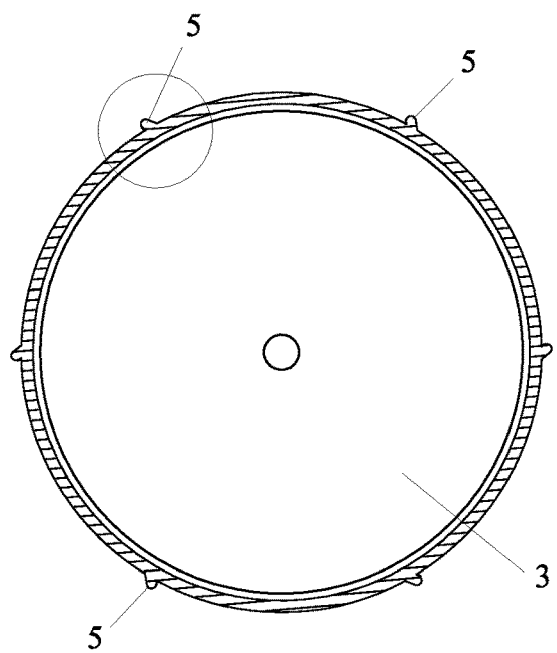
FIG. 7 is a simplified sectional view taken along line VII-VII in FIG. 5.
Figure 8:
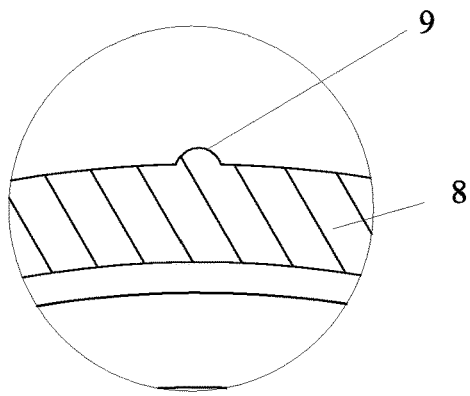
FIG. 8 is an enlargement of the part circled in FIG. 6.

It must be said that all the protrusions may be inclined by the same angle and in the same direction, as can be seen in FIG. 7.

The particular angle, in the sectional view, of the protrusions makes the said protrusions advantageously flexible (for contact with the mouth of the external vessel 2) and allows for better fixing and adaptability (to the blowing tolerances) of the internal vessel 3, which is thereby fixed in a stable manner to the external vessel 2, but still so as to be easily removable (by hand).

In the present document, the words "easily removable" means that the internal vessel is not removable or unfastenable from the external vessel 2 during normal use, not even if overturned or as a result of blows deemed acceptable in the context of normal use of the container. Nevertheless, the internal vessel is removable without the use of specific tools or without a user applying excessive force when wishing to separate the internal vessel 3 from the external vessel.

Removing the internal vessel 3 is useful both to replace, where necessary, the internal vessel 3 with a new one, or simply to sort the waste prior to disposal thereof.

Figure 3:
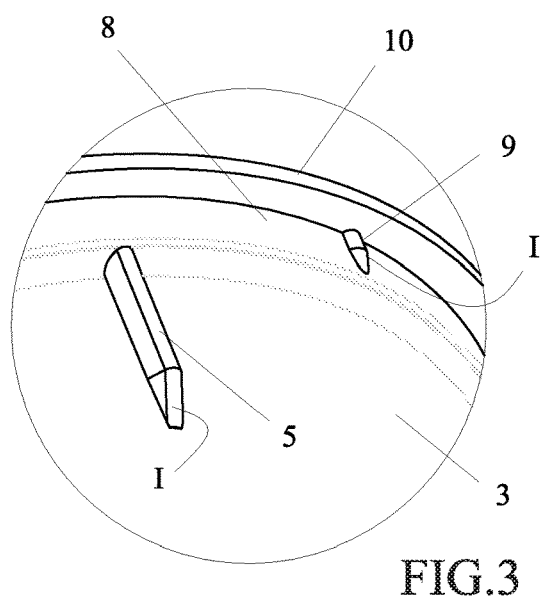
FIG. 3 is an enlarged view of the detail circled in FIG. 2.
Figure 4:
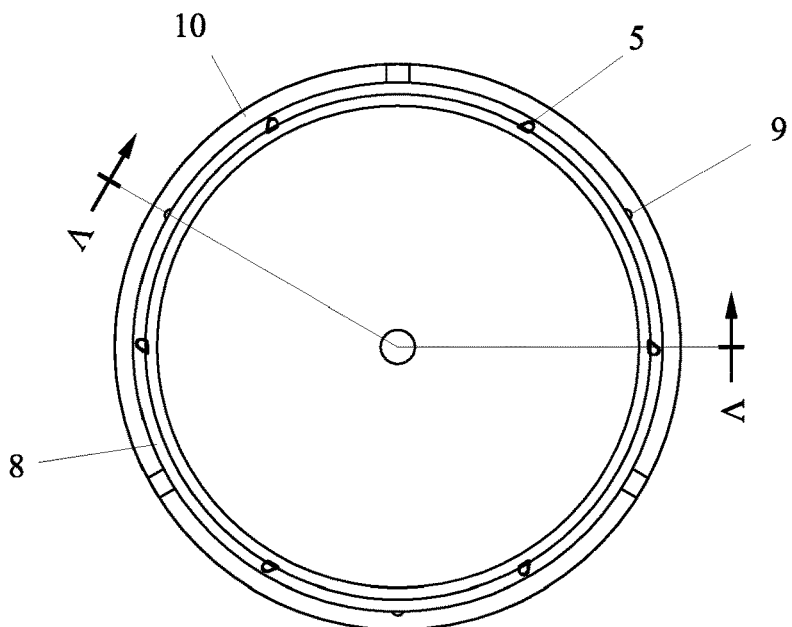
FIG. 4 is a bottom-up plan view of the container in FIG. 2.

As better visible in FIG. 3, the fixing portion 4 can have a step 8 which extends around the whole perimeter of the internal vessel 3, on the step 8 there being optionally envisaged at least three further protrusions 9, which preferably extend along the entire height of the said step 8.

The step is configured to cooperate with a zone of the external vessel 2 which, by virtue of the blowing process during production, has more accurate tolerances than those of other zones of the vessel 2 which are distant therefrom. Indeed, this is the zone where the neck is formed, using a calibrated nozzle which ensures dimensions with tolerances similar to an injection-moulding process; beyond this edge (i.e. at a distance therefrom) the glass undergoes the blowing process and therefore the tolerances become less accurate.

In this way, the step 8 alone can ensure sufficiently accurate centring of the internal vessel 3 in the external vessel 2.

To further improve this centring, as already mentioned, the step 8 may feature the said further protrusions 9.

If the step 8 is present, the protrusions 5 can extend from the said step 8 (towards the bottom of the vessel 3), or at least be in direct contact therewith. If the step 8 is not present, the protrusions 5 can extend from (or be in direct contact with) a flange 10.

The flange 10, that may be provided at a free edge of the internal container 3 and/or at its mouth, rests on a free edge of the external container 2, at its mouth 2B, for example to prevent the bottom of the internal container 3 to touch the internal bottom of the external container 2.

Of course, the flange 10 may be provided on the internal container 3 also in absence of the step 8.

The presence of the flange 10 is also important because it may slightly protrude from the mouth 2B of the external container. Therefore it may be used as a grabbing portion to extract the internal container 3 from the external container 2.

Obviously, the protrusions 5 (and also the further protrusions 9), the flange 10, and the step 8 are made as a single piece with the (moulded) internal vessel 3. Indeed, the internal vessel is preferably made as a single piece, which may also be co-moulded.

It is also possible to make an annular adapter which essentially delimits the fixing portion 4, which may be coupled by snap-fitting, in an irremovable manner, to an element for containment of the internal vessel 3. In this case, the internal vessel 3 may, in fact, be made as two pieces which are irremovably joined (by the end user).

The internal vessel 3, at his mouth, may have the aforesaid flange 10 resting on a free edge of the external vessel 2. The step 8 may extend from the said flange (or be in direct contact therewith).

Figure 5:
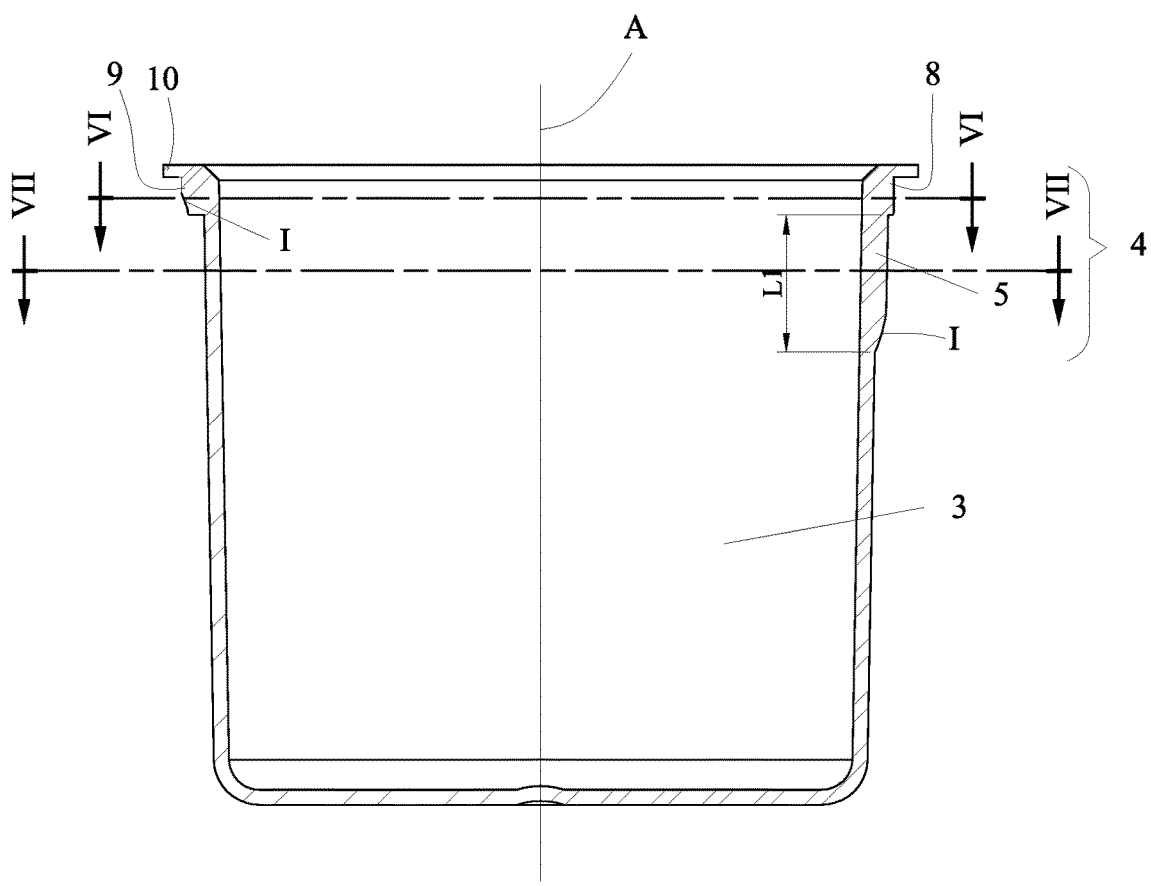
FIG. 5 is an axial sectional view of the container in FIG. 2, taken along line V-V in FIG. 4.
Figure 6:
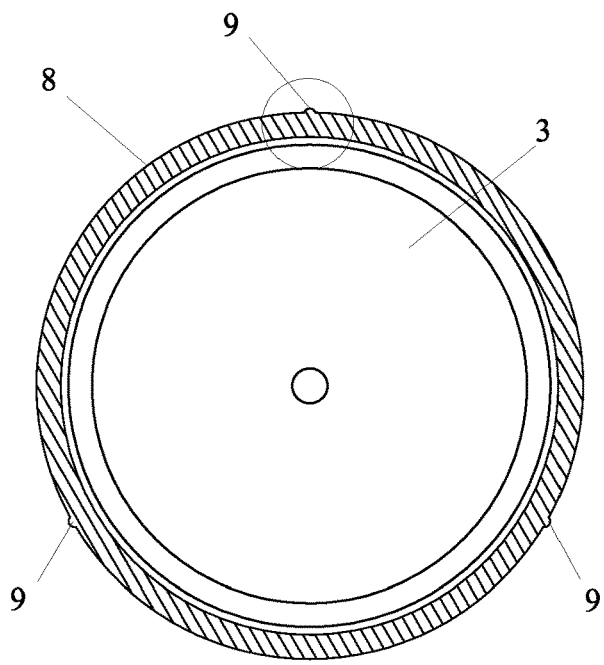
FIG. 6 is a simplified sectional view taken along line VI-VI in FIG. 5.

As can be seen in FIG. 5, the perimetral dimensions of the protrusions 5 may be less than or equal to the perimetral dimensions of the said step 8.

To improve insertion of the internal vessel 3 into the external vessel 2, the said protrusions 5 and/or the said further protrusions 9 may have a leading portion I.

Advantageously an external operating surface of the said protrusions 5 and/or of the said further protrusions 9 (i.e. the surface intended to come into stable contact with the external vessel 2), is inclined with respect to the said axis A of the internal vessel 3 by an angle ranging from 0.5 to 5°, preferably 2°.

The length L1 of the protrusions 5 may be such that the said protrusions do not extend (so as not to be visible) beyond a certain H-shaped band (FIG. 1) which is defined by the configuration of the neck of the external vessel 2. Indeed, the H-shaped band may extend from the free surface of the mouth of the external vessel to an almost horizontal or inclined section which joins a lateral surface of the vessel 3 with the neck thereof.

The step 8 and the further protrusions 9 may also be positioned (with vessel 3 and vessel 2 assembled) within this H-shaped band.

To end the description, it should be emphasised that the internal vessel 3 may have a protective film P (for example, heat-sealed, ultrasonically welded or otherwise bound), which protects the contents thereof (also in a watertight manner) until the said film is removed.

The protective film may be welded to the flange 10.

In this way, a new internal vessel 3 can be used as a refill when all the substance 6 contained in the original container is finished.

Furthermore, the external vessel 2 may have a thread 11 for screw coupling to a cap (not shown) on the container, which is advantageously configured so as to hermetically seal the container, for example by cooperating hermetically with the flange 10.

It has been seen that a container like the one described is very environmentally advantageous since the said container allows effective removal of the internal vessel 3 once the contents thereof are finished, both for the purposes of reusing the external vessel 2 and the lid, and for the purposes of sorting the waste when disposing of the container.

Furthermore, the presence of the axial ribbing, i.e. the protrusions 5 (and likewise the particular configuration thereof) ensures easy extraction of the internal vessel, combined with stable fixing thereof in position during use.

Various embodiments of the innovation have been disclosed herein, but further embodiments may also be conceived using the same innovative concept.

The invention claimed is:

1. A container (1) comprising an external vessel (2) in blown glass or plastic, which defines a cavity (2A) in which an internal vessel (3) configured to house a fluid substance (6) is placed, isolating the fluid substance (6) from the external vessel (2), the inner vessel (3) having a flange (10) resting on a free edge of the container (2), and a fixing portion (4) through which it is constrained to the external vessel (2) at least in correspondence with its mouth (2B), wherein the fixing portion (4) has at least three protrusions (5) with mainly axial development, configured to deform when they come into contact with the mouth (2B) of the external vessel (2) thus binding in an easily removable way the internal vessel (3) to the external vessel by friction;

wherein the external vessel includes a neck defined by a first diameter and a lateral surface defined by a second diameter larger than the first diameter; and wherein the protrusions do not extend below the neck.

2. The container (1) according to claim 1, wherein at least one of said protrusions (5), as seen in a cross section perpendicular to a vertical axis (A) of the inner container (3), forms a central axis which is inclined at an angle ($\alpha$) different from zero, with respect to a normal (R) to the outer surface of the inner vessel (3) passing through a base (5A) of each protrusion.

3. The container according to claim 2, wherein said normal (R) is a radius of the inner vessel (3).

4. The container according to claim 2, in which the angle ($\alpha$) is between 10° and 60°.

5. The container according to claim 4, in which said step (8) extends from said flange (10).

6. The container according to claim 2, in which the angle ($\alpha$) is between 30° and 45°.

7. The container according to claim 1, wherein the fixing portion (4) has a step (8) which extends along the entire perimeter of the internal container (3).

8. The container according to claim 7, further including at least three further protrusions (9) on the step (8).

9. The container according to claim 8, wherein the at least three further protrusions (9) extend over the entire height of said step (8).

10. The container according to claim 8, in which said protrusions (5) or said further protrusions (9) have a leading portion (I).

11. The container according to claim 8, wherein an external operating surface of said protrusions (5) or said further protrusions (9) are inclined with respect to said axis (A) of the inner container (3) of an angle comprised between 0.5 and 5°.

12. The container according to claim 11, wherein the angle of inclination is 2°.

13. The container according to claim 7, wherein said protrusions (5) extend from said step (8).

14. The container according to claim 1, in which the radial size of said protrusions (5) is less than or equal to the perimeter size of said step (8).

15. The container according to claim 1, wherein the inner container has a protective film (P), which protects its contents until it is removed.

16. The container according to claim 1, wherein the outer vessel (2) has a thread (11) for screw coupling to a cap of the container.

17. The container according to claim 1, wherein the at least three protrusions are adapted to deform and contact the mouth upon insertion in the external vessel.

* * * * *